United States Patent
Moon

(10) Patent No.: US 7,779,300 B2
(45) Date of Patent: Aug. 17, 2010

(54) SERVER OUTAGE DATA MANAGEMENT

(75) Inventor: Carroll W. Moon, Altavista, VA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 11/782,552

(22) Filed: Jul. 24, 2007

(65) Prior Publication Data

US 2009/0031174 A1    Jan. 29, 2009

(51) Int. Cl.
    G06F 11/00 (2006.01)
(52) U.S. Cl. ........................................ 714/25
(58) Field of Classification Search ............ 714/4, 714/25, 46, 57
    See application file for complete search history.

(56) References Cited

U.S. PATENT DOCUMENTS

| | | | |
|---|---|---|---|
| 6,560,717 B1 * | 5/2003 | Scott et al. ............... | 714/4 |
| 6,708,297 B1 | 3/2004 | Bassel | |
| 6,829,639 B1 | 12/2004 | Lawson et al. | |
| 6,883,119 B1 * | 4/2005 | Bette et al. ............. | 714/43 |
| 7,103,810 B2 | 9/2006 | Childress et al. | |
| 7,155,514 B1 | 12/2006 | Milford | |
| 7,213,176 B2 | 5/2007 | Banko | |
| 7,293,201 B2 * | 11/2007 | Ansari ................. | 714/38 |
| 7,337,365 B2 * | 2/2008 | Zunino et al. .......... | 714/38 |
| 2003/0028817 A1 * | 2/2003 | Suzuyama et al. ........ | 714/4 |
| 2004/0024865 A1 * | 2/2004 | Huang et al. ........... | 709/224 |
| 2004/0153693 A1 * | 8/2004 | Fisher et al. ........... | 714/4 |
| 2004/0158762 A1 * | 8/2004 | Abraham, Jr. ........... | 714/1 |
| 2004/0203440 A1 * | 10/2004 | Katz ................... | 455/67.11 |
| 2005/0038888 A1 | 2/2005 | Labertz | |
| 2006/0031476 A1 * | 2/2006 | Mathes et al. .......... | 709/224 |
| 2006/0179140 A1 | 8/2006 | John et al. | |
| 2006/0233312 A1 * | 10/2006 | Adams et al. ........... | 379/21 |
| 2006/0244585 A1 * | 11/2006 | Bishop et al. .......... | 340/506 |
| 2006/0248407 A1 * | 11/2006 | Adams et al. ........... | 714/43 |
| 2007/0028147 A1 * | 2/2007 | Huang et al. ........... | 714/43 |
| 2007/0088816 A1 | 4/2007 | Hrustemovic et al. | |
| 2008/0181099 A1 * | 7/2008 | Torab et al. ............ | 370/216 |
| 2008/0313491 A1 * | 12/2008 | Adams et al. ........... | 714/4 |
| 2009/0031174 A1 * | 1/2009 | Moon .................. | 714/47 |

OTHER PUBLICATIONS

Gunter, et al. "NetLogger: A Toolkit for Distributed System Performance Analysis", MASCOTS Modeling, Analysis and Simulation of Computer and Telecommunication Systems, 2000, pp. 267, IEEE Computer Society, USA.

Congnos Inc. "Cognos Decision Stream—Fact Sheet", http://www.cognos.com/products/business_intelligence/data_preparation/factsheet.html.

Fair, et al., "Reliability, Availability and Serviceability (RAS) of the IBM eServer z990", IBM Journal of Research and Development, 2004, vol. 48, No. 3/4.

* cited by examiner

Primary Examiner—Bryce P Bonzo
(74) Attorney, Agent, or Firm—Vierra Magen Marcus & DeNiro LLP

(57) ABSTRACT

Server outage data is automatically created and managed. Outage data is automatically retrieved from one or more servers at which an outage is detected by an agent installed on the server. The agent may search for outage event data and transmit the data to a monitoring application. The monitoring application receives the event data and creates an outage record from the data. Server contents, such as the number of users having account data on the server, can be determined either before or after the outage has occurred. Once the outage data and server contents are known, the cost and impact of the outage for each particular server can be determined. The cost of a server outage may be determined based on the outage record and the server data identifying resources of the server, such as user account data.

20 Claims, 12 Drawing Sheets

Server data table

| Server ID | Application ID | Mailboxes |
|---|---|---|
| 001 | 002 | 500 |
| 001 | 003 | 450 |
| 002 | 004 | 550 |

Figure 2B

Record Mapping Table

| incident Record ID | Outage Record ID |
|---|---|
| 001 | 002 |
| 001 | 003 |
| 002 | 004 |

Figure 2C

Outage table

| Outage Record ID | Server ID | Database ID | Outage event time | Server Available time | Outage event Date |
|---|---|---|---|---|---|
| 001 | 001 | 0100 | 0600 | 0830 | 2005.06.10 |
| 002 | 002 | 0200 | 0600 | 0830 | 2005.06.10 |
| 003 | 003 | 0320 | 1430 | 1445 | 2005.06.14 |

Figure 2D

SERVER OUTAGE DATA MANAGEMENT

BACKGROUND

With the evolving popularity of the Internet, the reliability of applications which provide web-based services over the internet has become very important to companies that provide them. In particular, it has become very important to detect, track and resolve server failures for services provided to customers.

Information technology infrastructure library (ITIL) is a best practice approach used to track services that facilitate the delivery of quality information technology (IT) services. An ITIL compliant system may deal with server outages based on creating a sequence of records. First, upon receiving an alert of a server outage, a user or administrator of a system employing ITIL may manually create an incident record to document the outage. The user may then apply a series of attempts to quick-fix the outage, such as reboot the server. If the user cannot fix the server, the user creates a problem record from incident record. If the 'problem' with the server is eventually fixed, an error record is created from the problem record once the problem is solved.

Data used to create the incident, problem, error records and other records is typically entered by a user. Thus, the data is usually not completely accurate and generally not reflective of the actual outage of a server. Additionally, it is difficult to determine the cost of a server outage based on metrics indicating the number of servers that are down, especially when the metrics are based on data which is manually generated by one or more users which run a system employing ITIL.

SUMMARY

The present technology may be used to automatically create and manage server outage data. Outage data is automatically retrieved from one or more servers at which an outage is detected. Server contents, such as the number of users having account data on the server, can be determined either before or after the outage has occurred. Once the outage data and server contents are known, the cost and impact of the outage for each particular server can be determined. In this manner, accurate data regarding the server outage and the cost of the outage may be provided by a monitoring system which monitors the server.

Outage data may be retrieved automatically from a server being monitored. The outage data may indicate the time the outage occurred, the time that data and/or services were made available by the monitored server after the outage, the number of users that lost service due to the outage, and other data. In some embodiments, an agent installed on the server may search for outage event data at server boot-up. The agent accesses a server event log to search for events that indicate a server outage occurred and an event indicating the server is back online. The event data and corresponding time of the events is transmitted to a monitoring application. In some embodiments, the number of users which had connections to the server at the time of outage is also determined and transmitted to the monitoring application by the agent. The monitoring application receives the event data and creates an outage record which contains outage time data.

The cost of a server outage may be determined based on the automatically determined outage record and the server data retrieved from the server. The monitoring system may retrieve server data from a monitored server at any time before or after a server outage. An agent installed on the server may provide server data indicating resource information for a particular server, such as the number of users having account data on the server, the number of exchange servers on a particular machine, and other data. The cost of a server outage may be represented as the number of user accounts on a server multiplied by the time of the outage. Other ways of determining cost are possible, based on data contained in the outage record, server data for servers mentioned in the outage record, and other data ultimately linked to the outage record.

An embodiment provides a method for managing server outage data. First, a first time stamp and second time stamp are received. The first time stamp is associated with an event corresponding to the start of a server outage at a monitored server. The second time stamp is associated with a time that application data was made available by the monitored server after the server outage. The first time stamp and the second time stamp are then automatically stored as an outage record. User input associated with the server outage, and an incident record is created in response to the received user input. The outage record is then linked to the incident record.

An embodiment updates incident records with outage record data. First, incident data for a server outage is received from a user and an incident record is created from the received incident data. Time data associated is then received which is associated with the time that application data was unavailable during the server outage. An outage record is automatically generated based on the time data and mapped to the incident record. The incident record is then updated with data from the outage record.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 2B is an example of a server data table.

FIG. 2C is an example of a record mapping table.

FIG. 2D is an example of an outage table.

DETAILED DESCRIPTION

Figure 1:
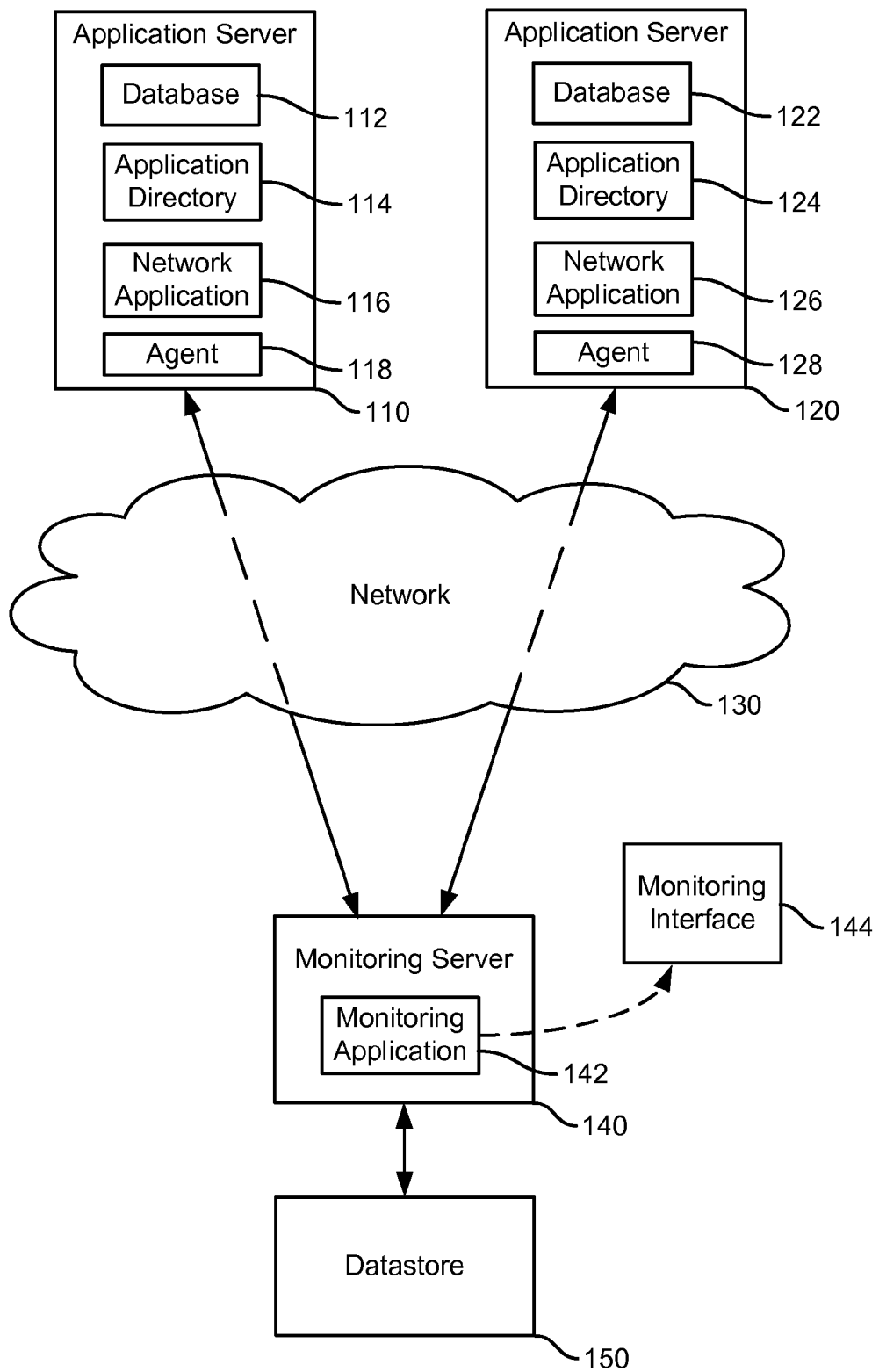
FIG. 1 is a block diagram of an embodiment of a system for managing server outage data.

A server monitoring system includes a monitoring application that automatically creates and manages server outage data. Outage data is automatically retrieved from one or more servers at which an outage is detected by the monitoring application. Contents of the server, such as the number of users having account data on the server, server applications, and other data, can be determined either before or after the outage has occurred. Once the outage data and server contents are known, the costs and impact of the outage for each particular server can be determined. In this manner, accurate data regarding the server outage and the cost of the outage may be provided by a monitoring system which monitors the server.

Outage data may be retrieved automatically from a server being monitored. The outage data may include the time the outage occurred, the time that data and/or services were made available by the monitored server after the outage, the number of users that lost service due to the outage, and other data. To retrieve the data, a server launches an agent previously installed on the server when a server that has experienced an outage comes back online. The launched agent accesses a server event log to search for events that indicate a server outage occurred. If a server outage event is detected in the log, the agent retrieves a logged time stamp associated with the server outage event. The agent may also determine whether the event log contains a second event which indicates that the server came back online and was functioning correctly. If the server online event is contained in the event log, the agent retrieves the time stamp associated with the server online event. In some embodiments, information for an event is retrieved or determined by script code or some mechanism other than an agent.

The event ID and time stamp data is transmitted by the agent to a monitoring application. In some embodiments, the number of users which were using the server at the time of outage is also determined by the agent and transmitted to the monitoring application. The monitoring application receives the event data and creates an outage record which contains actual outage duration time data (the received time stamps or the duration derived from the time stamp data). The outage record may then be stored and linked to other records, such as an incident record.

The monitoring system may retrieve server data from a monitored server before or after a server outage. The server data may include the number of user accounts stored on the server, the type of server, and other data related to a resource provided by the server. In some embodiments, an agent installed on the server can be programmed to report the contents of the server upon agent initialization and upon changes detected by the agent. Additionally, a monitoring application may request server content data from the agent.

The cost in terms of true resource downtime, user impact and other information of a server outage may be determined based on the automatically determined outage record and the server data retrieved from the server. In some embodiments, financial metrics may also be determined from the downtime and user impact cost. For example, an outage record may indicate that an outage occurred on a first server for a period of 10 minutes. The server data for the first server may indicate that account data for one hundred users was stored on the server. Therefore, the cost of the outage may be represented as 100 users times 10 minutes, or 1000 minutes. Also, the outage record may indicate that 35 users were actually using the server and lost communication due to the outage. In this case, the actual outage cost could be represented as 350 minutes. Other ways of determining cost are possible, based on data contained in the outage record, server data for servers mentioned in the outage record, and other data linked to the outage record.

FIG. 1 is a block diagram of an embodiment of a system for managing server outage data. The system of FIG. 1 includes application servers 110 and 120, network 130, monitoring server 140 and data store 150. The system of FIG. 1 may include any number of application servers, although only two application servers 110 and 120 are illustrated in FIG. 1.

Application server 110 includes database 112, application directory 114, network application 116 and agent 118. Database 112 stores data accessed by network application 116 and other applications on server 110 (not illustrated). For example, database 112 may store data for one or more user accounts (for example, user mailbox data) for a service provided by application server 130 over network 130.

Application directory 114 may be used to store content, hierarchy and other information related to files and applications stored on application server 110. In some embodiments, application directory 114 may be implemented as one or more files or applications which implement "Active Directory," by Microsoft Corporation of Redmond, Wash. Application directory 114 may be queried to provide file and application information to a requesting entity, such as agent 118.

Network application 116 may be any application used to provide a service over network 130 to one or more users. For example, the service may be a web-based service, such as a web-based e-mail service. Agent 118 may be implemented as an application, program, or some other mechanism loaded onto application server 110. Agent 118 may be implemented as a program, plug-in or some other code on application server 110. Agent 118 may communicate with monitoring application 142 on monitoring server 140, application directory 114, database 112, and network application 116. Agent 118 may also access other components and data on application 116, such as one or more event logs.

Application server 120 includes database 122, application directory 124, network application 126, and agent 128, and is similar to application server 110.

Network 130 may be implemented as one or more public or private networks over which one or more machines may communicate. For example, network 130 may be implemented as a public or private intranet or internet, such as the Internet or World Wide Web.

Monitoring server 140 is in communication with application server 110, 120 and data store 150, and includes monitoring application 142. Monitoring application 142 may communicate with agents 118 and 128 over network 130 to collect and provide data. Monitoring application 142 may also automatically create and manage server outage records for server 110 and 120, or any other server that monitoring application is monitoring.

Monitoring application 142 may provide monitoring interface 144. Interface 144 may be provided on a display device and receive user data, display server outage data, and otherwise manage outage and other data associated with the performance of monitored application servers 110-120. In some embodiments, monitoring application 142 may be implemented by one or more applications. For example, monitoring application 142 may be implemented at least in part by "Microsoft Operations Manager," (MOM) by Microsoft Corporation.

Data store 150 may be implemented as one or more servers or storage systems and is in communication with monitoring server 140. Data store 150 may be used to store data associated with or managed by monitoring application 142, including outage data, in one or more tables. These tables are discussed in more detail below with respect to FIGS. 2A-2D. In some embodiments, data store 150 may be implemented as one or more SQL servers.

Figure 2A:
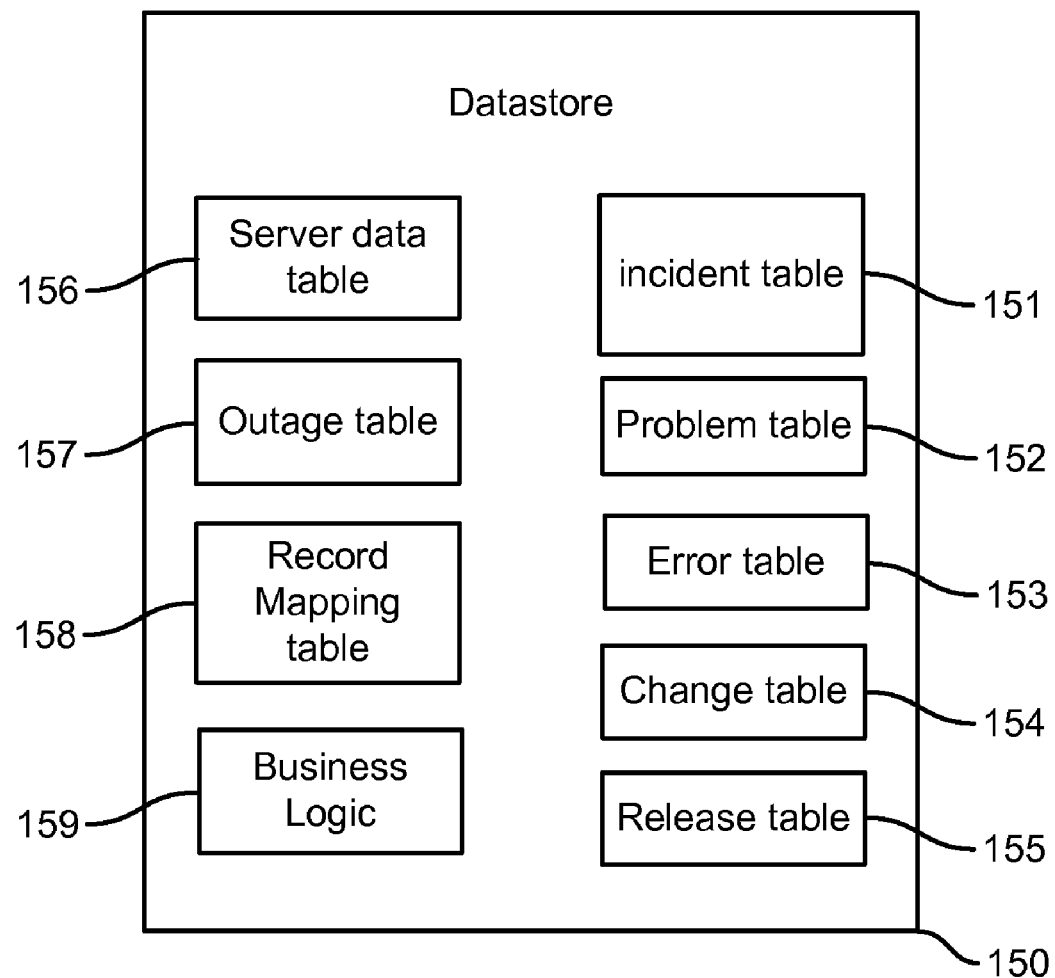
FIG. 2A is a block diagram of an embodiment of a data store.

FIG. 2A is a block diagram of an embodiment of data store 150. Data store 150 includes incident table 151, problem table 152, error table 153, change table 154, release table 155, server data table 156, outage table 157, record mapping table 158 and business logic 159.

Tables 151-155 store ITIL based records regarding a detected malfunction of a server or a change in a server's state, whether planned or unplanned by a user of the system. Incident table 151 includes records for an incident. An incident may be an unexpected deviation from a normal level of service provided by a server. A new incident record is typically manually created by a user. Problem table 152 includes one or more problem records. A problem is an incident which cannot be fixed easily by a user. One problem record may be linked to one or more incident records within problem table 152. Error table 153 may store one or more error records. An error record is created from a solved problem record. For example, if a problem associated with a problem record has been solved, that problem record then becomes an error record. Change table 154 includes one or more change records. A change record is typically associated with a discreet change to one computer. Release table 155 includes one or more release records. A release record may be associated with a release, which may include several changes to many servers or other machines.

Tables 156-158 are related to outage data or processing the outage data. Server data table 156 indicates user data and other data located on a particular server. Server data table 156 may be generated by monitoring application 142 and is used to determine the impact or cost of an outage experienced by a server. Outage table 157 contains one or more outage records. Each outage record may be associated with an outage detected for server 110 or 120 and generated automatically. Record mapping table 158 includes data which maps or "links" one or more outage records to other records, such as an incident record.

Business logic 159 on data store 150 provides logic for maintaining tables 156-158. For example, business logic 159 may include logic for linking outage records to incident records, creating and storing outage data in outage table 157, and creating server data records.

FIG. 2B is an example of a server data table. The server data table of FIG. 2B provides an example of server data table 156 of FIG. 2A. The table includes columns of "server ID," "application ID" and "Mailboxes." In the first row of data, a server ID of "001" is associated with an application ID of "002." The data record for this server ID and application ID indicates that 500 mailboxes are stored on the server and associated with the particular application. The second row of data indicates that 450 mailboxes are associated with the same server ID and an application ID of "003." Thus, 950 user mailboxes are stored on the server having a server ID "001" according to the example server data table. Similarly, 550 user mailboxes are stored on a server having a server ID "002" and associated with application ID "004."

FIG. 2C is an example of a record mapping table. The table of FIG. 2C provides an example of record mapping table 158 of FIG. 2A. As illustrated in the table of FIG. 2C, one or more outage record IDs can be mapped to an incident record ID. For example, the outage records with identifiers of "002" and "003" are mapped to an incident record having an ID of "001." Outage record ID "004" is mapped to the incident record having an ID of "002." An outage record may be mapped to other types of records besides incident records, such as problem records, error records and other records. The record mapping table of FIG. 2C which shows a linking of outage records to incident records is provided merely as an example.

FIG. 2D is an example of an outage table. The outage table of FIG. 2D is an example of outage table 157 and includes columns of outage record ID, server ID, database ID, outage event time, server available time and outage event date. The first row of data indicates that a first outage record having an identifier of "001" is associated with a server ID of "001" and a database ID of "0100." The particular outage record has an outage event time of 0600 and a server available time of 0830 on a date of Jun. 10, 2005. Thus, the outage associated with outage record ID "001" lasted for a duration of two hours and thirty minutes (2:30). The outage record associated with record ID "002" took place on a server identified as "002" and database "0200" but server during the same time as the first outage record. The third outage record having an outage record ID of "003" is associated with a server ID of "003" and a database ID of "0320." The outage event time with the third outage record ID is "1430" and the server available time is "1445." Thus, the third outage record had a total outage time of 15 minutes.

FIGS. 3-10 will be discussed with respect to application server 110 of the system of FIG. 1. This is for purposes of example only, and is not intended to limit the scope of the technology to processing, monitoring or otherwise operating with only one server.

Figure 3:
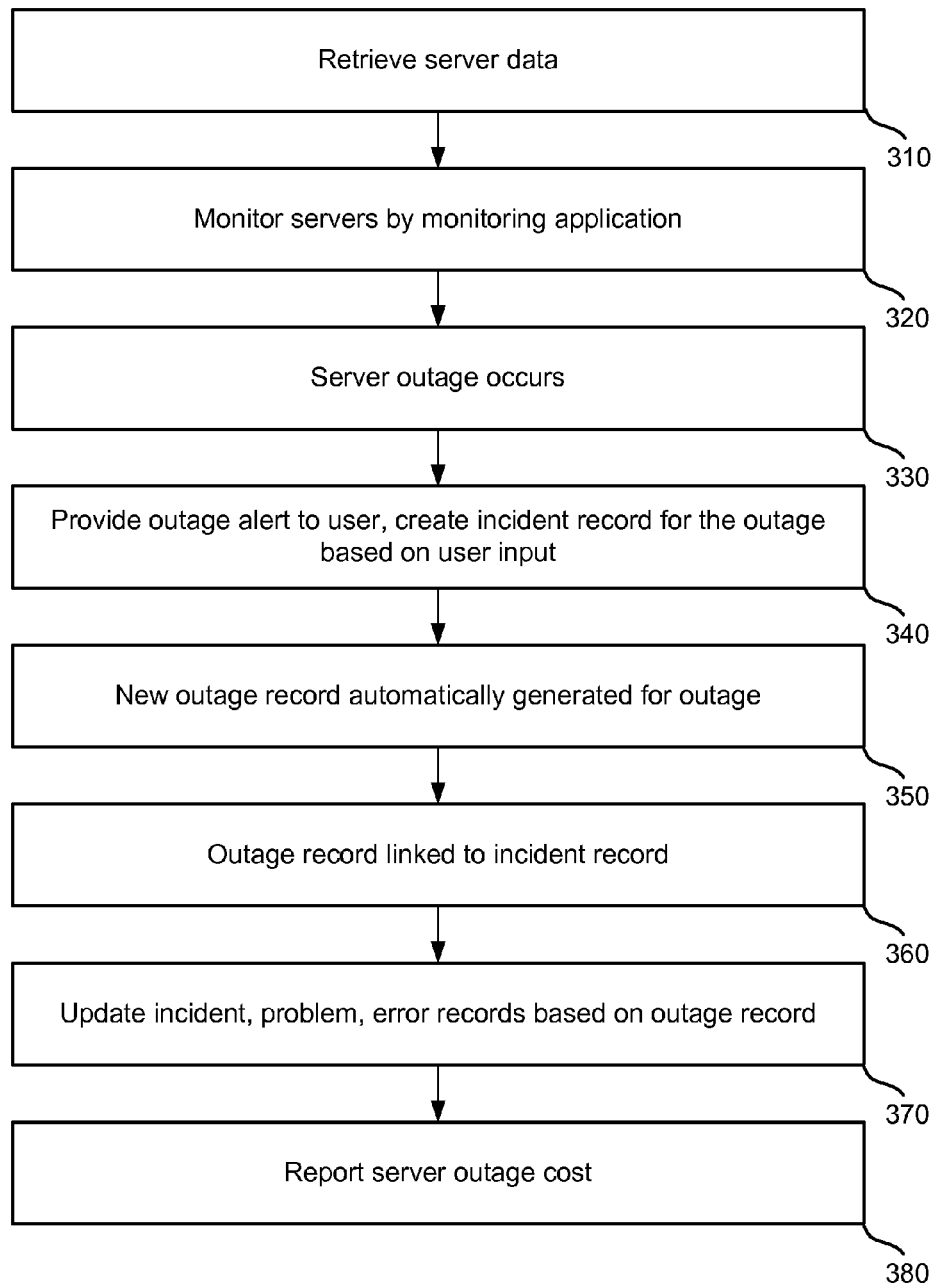
FIG. 3 is a flowchart of an embodiment of a method for managing server outage data.

FIG. 3 is a flowchart of an embodiment of a method for managing server outage data. First, server data is retrieved at step 310. In some embodiments, server data is retrieved and placed into server data table 156. Creating server data table 156 may include installing agent 118 on server 110 if it is not already installed, sending application monitoring requests to agent 118, and receiving information from the agent. Retrieving server data at step 310 is discussed in more detail below with respect to FIG. 4.

Server 110 is monitored by monitoring application 142 at step 320. Monitoring server 110 may include determining a change in user data stored on the server, the status or state of the server or other information regarding the server. Monitoring server 110 by monitoring application 142 is discussed in more detail below with respect to FIG. 5. At some point, a server outage occurs at step 330. A server outage may be identified as a level of server performance which is below a threshold level. Thus, a server outage may comprise a degraded level of server performance which has fallen below a threshold service level or a complete server crash. The server outage may be due to a bug, outdated code, maintenance or some other reason.

An outage alert is provided to a user and an incident record is created for the outage at step 340. The alert can be sent to the user in any of several ways, including via e-mail or pager. Upon receiving the alert, the user manually creates an incident record for the outage. The incident record data is created based on user data received through monitoring interface 144. Receiving an outage alert by the user and creating an incident record is discussed in more detail below with respect to FIG. 6.

A new outage record is automatically generated for the outage at step 350. The data in the outage record may be automatically retrieved and stored as part of the record at step 350. Automatically generating a new outage record for the outage which occurred at step 330 is discussed in more detail below with respect to FIG. 7.

The outage record generated at step 350 is linked to an incident record at step 360. In some embodiments, one or more outage records may be linked to an incident record, or some other type of record. The record may be linked by a user through input received by monitoring application 142 through monitoring interface 144. Linking one or more outage records to an incident record is discussed in more detail with respect to FIG. 8.

An incident, problem, error record or some other record may be updated based on the outage record at step 370. Updating records may include using data from the outage record to populate or replace data in a record to be updated. This is discussed in more detail below with respect to FIG. 9. A server outage cost associated with the outage may be reported to a user, file or some other entity at step 380. Reporting server outage cost may include generating a report with the cost or impact of the outage. The outage cost may be based on the outage data automatically collected and information for the server in which the outage occurred. Reporting server outage cost associated with an outage is discussed in more detail below with respect to FIG. 10.

Figure 4:
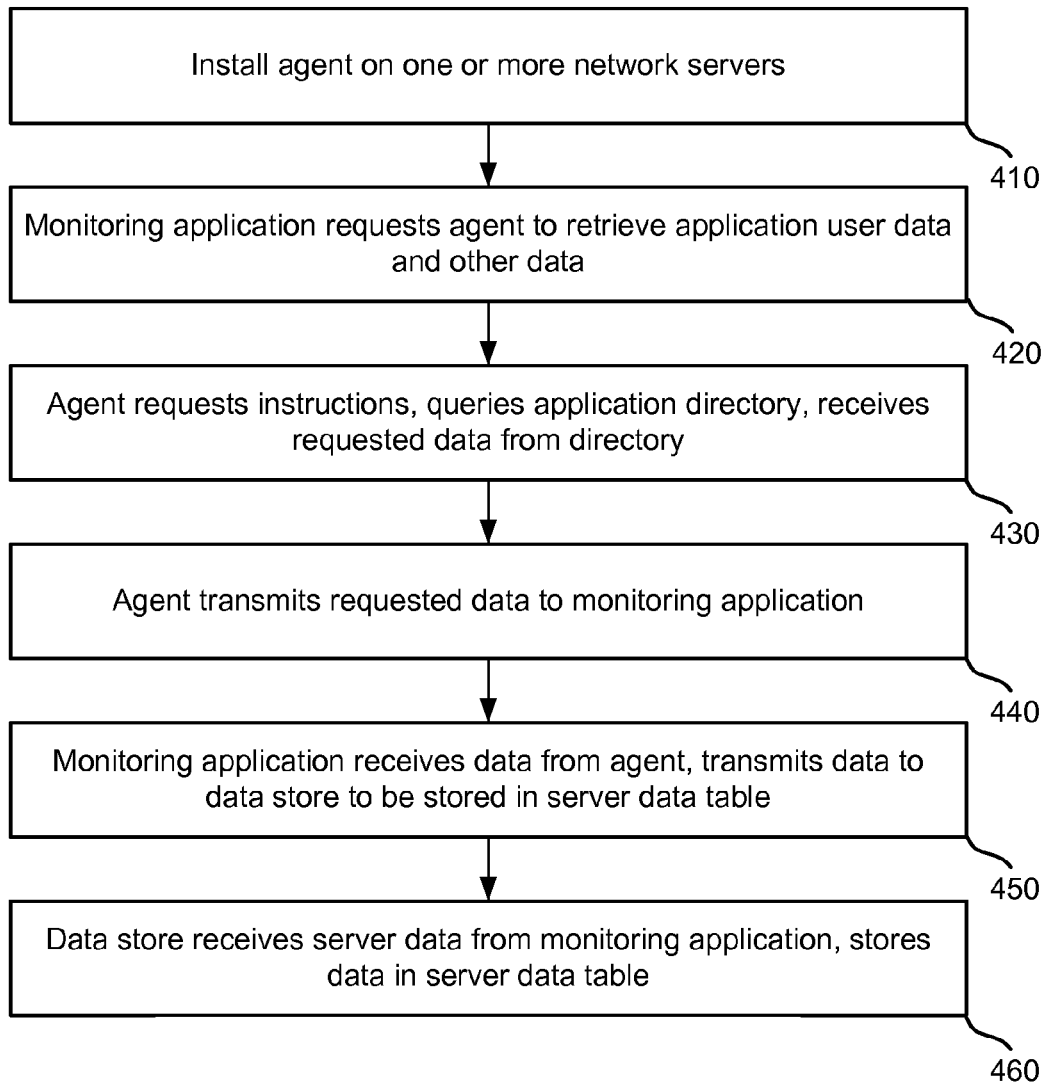
FIG. 4 is a flowchart of an embodiment of a method for retrieving server data.

FIG. 4 is a flowchart of an embodiment of a method for retrieving server data. In some embodiments, the method of FIG. 4 provides more detail for step 310 of the method of FIG. 3. First, agent 118 may be installed on network server 110 at step 410. Agent 118 may be installed on server 110 by monitoring application 142 over network 130. In some embodiments, agent 118 may be installed on application server 110 from a compact disc, DVD or some other memory storage device rather than being transmitted to application server 110 over network 130.

Monitoring application 142 sends a request to agent 118 to retrieve server data and other data at step 420. The request may be included in the installation instructions for agent 118 or provided separately after agent installation. The server data may include the number of users for which account data (for example, user mailbox data) stored on the application server, exchange server information, users currently logged in, the operating state of the server, or other information.

Agent 118 receives the requests, queries application directory 114 and receives the requested data from the directory at step 430. After receiving the requested data from application directory 114, agent 118 may transmit the requested data to monitoring application 142 at step 440.

Monitoring application 142 receives data from agent 118 and transmits the data to be stored in server data table 156 of data store 150 at step 450. Data store 150 receives the server data from monitoring application 142 and stores the data in server data table 156 at step 460.

Figure 5:
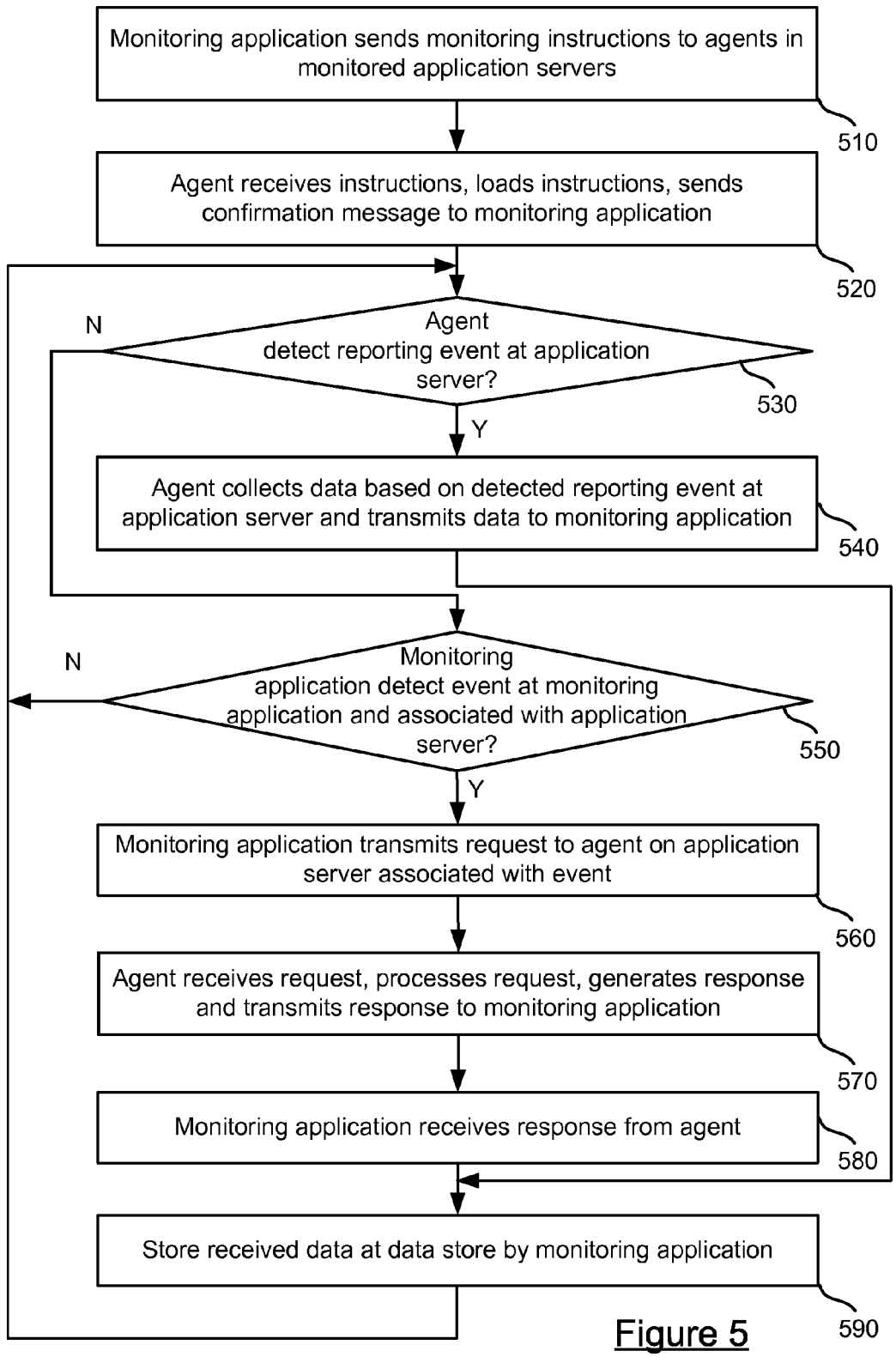
FIG. 5 is a flowchart of an embodiment of a method for monitoring servers.

In some embodiments, monitoring application 142 may monitor one or more servers to receive data from the application servers. The data may be pushed or pulled, or both, from each server. For example, data can be pushed by agent 118 to monitoring application 142 based on instructions loaded by agent 118. Data may also be pulled by monitoring application 142 from agent 118 based on a specific request sent to agent 118. Both pulling and pushing data may be performed in the embodiment of the system of FIG. 1. FIG. 5 discusses pushing and pulling data from agent 118 to monitoring application 142.

FIG. 5 includes a flowchart of an embodiment of a method for monitoring servers. In some embodiments, the flowchart of FIG. 5 provides more detail for step 320 of the method of FIG. 3. First, monitoring application 142 sends monitoring instructions to agent 118 within application server 110 at step 510. The instructions may configure agent 118 to automatically send information back to monitoring application 142 based on events occurring at the application server.

After agent 118 receives instructions, agent 118 loads the instructions and sends a confirmation to monitoring application 142 at step 520. In some embodiments, no confirmation message is sent by agent 118.

A determination is made as to whether agent 118 detects a reporting event at application server 110 at step 530. A reporting event may be a change in server configuration, server state, user data stored on application server 110 or some other event detected or communicated to agent 118. In some embodiments, the reporting event may be described by the instructions received by agent 118 at step 520. If a reporting event is detected by agent 118 at step 530, agent 118 collects data based on the detected event and transmits the data to monitoring application 142 at step 540. The method of FIG. 5 then continues to step 590.

If agent 118 does not detect a reporting event at step 530, a determination is made as to whether monitoring application 142 detects an event at the monitoring application and associated with a particular application server at step 550. An event associated with an application server may include the expiration of a timer manged by the monitoring application and associated with a particular application server (indicating that monitoring application 142 should query for an application server state) or other event. If monitoring application 142 does not detect an event at step 550, the method of FIG. 5 returns to step 530. If monitoring application 142 detects an event at step 550, monitoring application 142 transmits a request to agent 118 associated with the event at step 560. Agent 118 receives the request, processes the request and generates a response at step 570. The response is transmitted to monitoring application 142 at step 570. Monitoring application 142 receives the response from agent 118 at step 580. The received data is then stored at data store 150 by monitoring application 142 at step 590. If no response is received from the agent, for example when the application server being monitored is down, then the event is interpreted as an application server outage and the time of the sent message is stored as received data at step 590. The method of FIG. 5 then returns to step 530.

Figure 6:
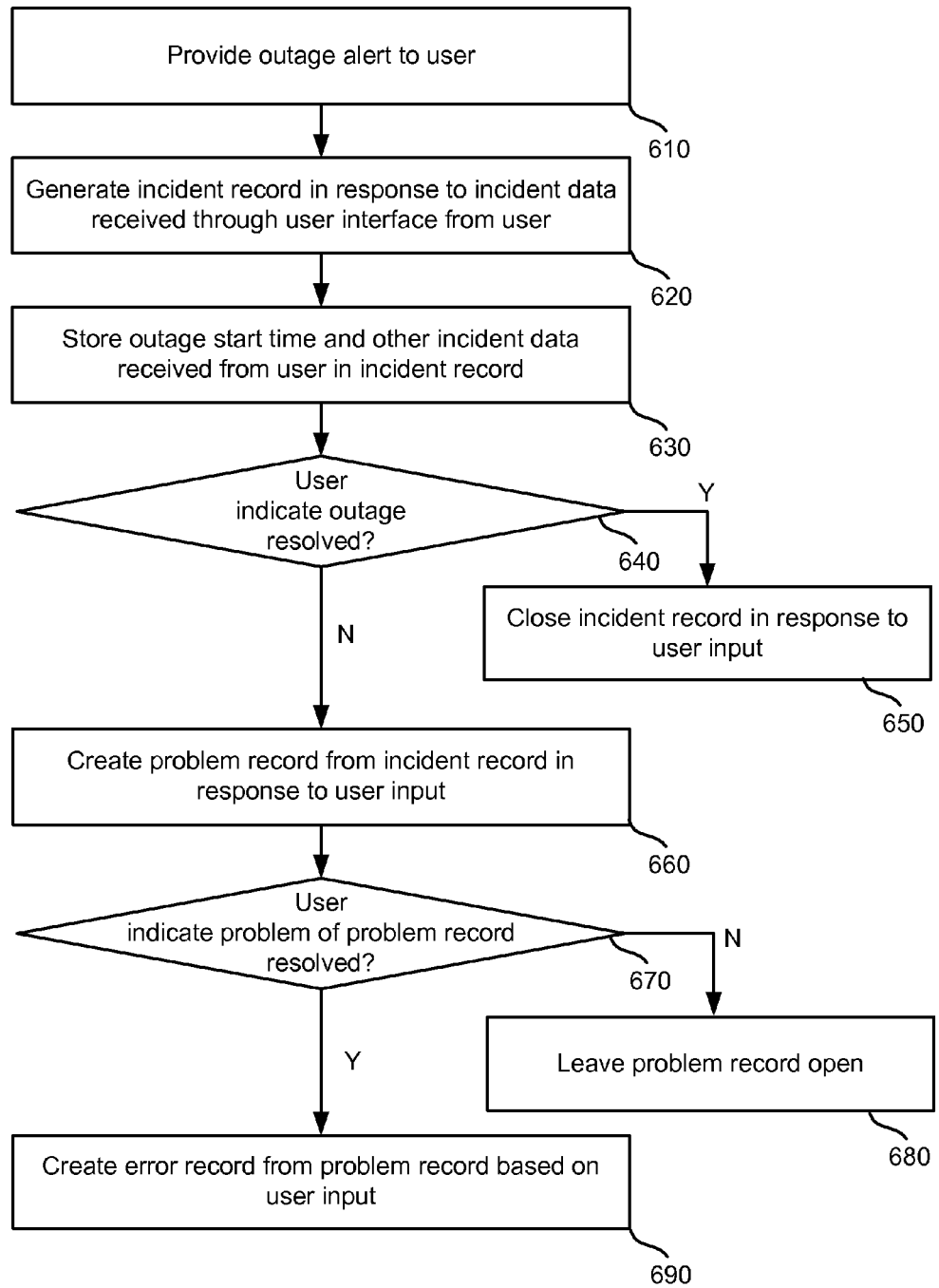
FIG. 6 is a flowchart of an embodiment of a method for creating an incident report based on user input.

FIG. 6 is a flowchart of an embodiment of a method for creating an incident report based on user input. In some embodiments, the method of FIG. 6 provides more detail for step 340 of the method of FIG. 3. First, an outage alert is provided to a user at step 610. The outage alert may be provided to the user in several ways, such as by e-mail, pager, SMS message, or in some other manner. Next, an incident record is generated in response to incident data received through monitoring interface 144 from a user at step 620. Conventionally, the incident record is generated based on user input which is manually provided through interface 144. The user may provide the outage time as the current time, the time of the alert, or some other time that the user determines is appropriate.

The outage start time and other incident data received from a user is then stored in an incident record at step 630. The incident record is stored in incident table 151 within data store 150.

A determination is then made as to whether a user indicates that an outage is resolved at step 640. An outage may be resolved if a user is able to quickly remedy the incident, such as a reboot the server at which the outage occurred. If an indication is received that the outage is resolved, the incident record is closed in response to the received user input at step 650. If the user has not indicated that the outage is resolved, a problem record is eventually created from the incident record in response to user input at step 660. In this case, the user provides input that the incident record is to be transformed into a problem record or linked to a new problem record or an existing problem record.

A determination is then made as to whether a user has indicated that the problem of the problem record has been resolved at step 670. This user indication may occur some time later than the alert received by the user at step 610. For example, the user may indicate a problem of a problem record is resolved hours, days or some other time after the original alert is provided to the user. If a user has not indicated that the problem of the problem record has been resolved, the problem record is left open at step 680. If the user has indicated that the problem of the problem record has been resolved, an error record is created from the problem record based on user input at step 690.

Figure 7:
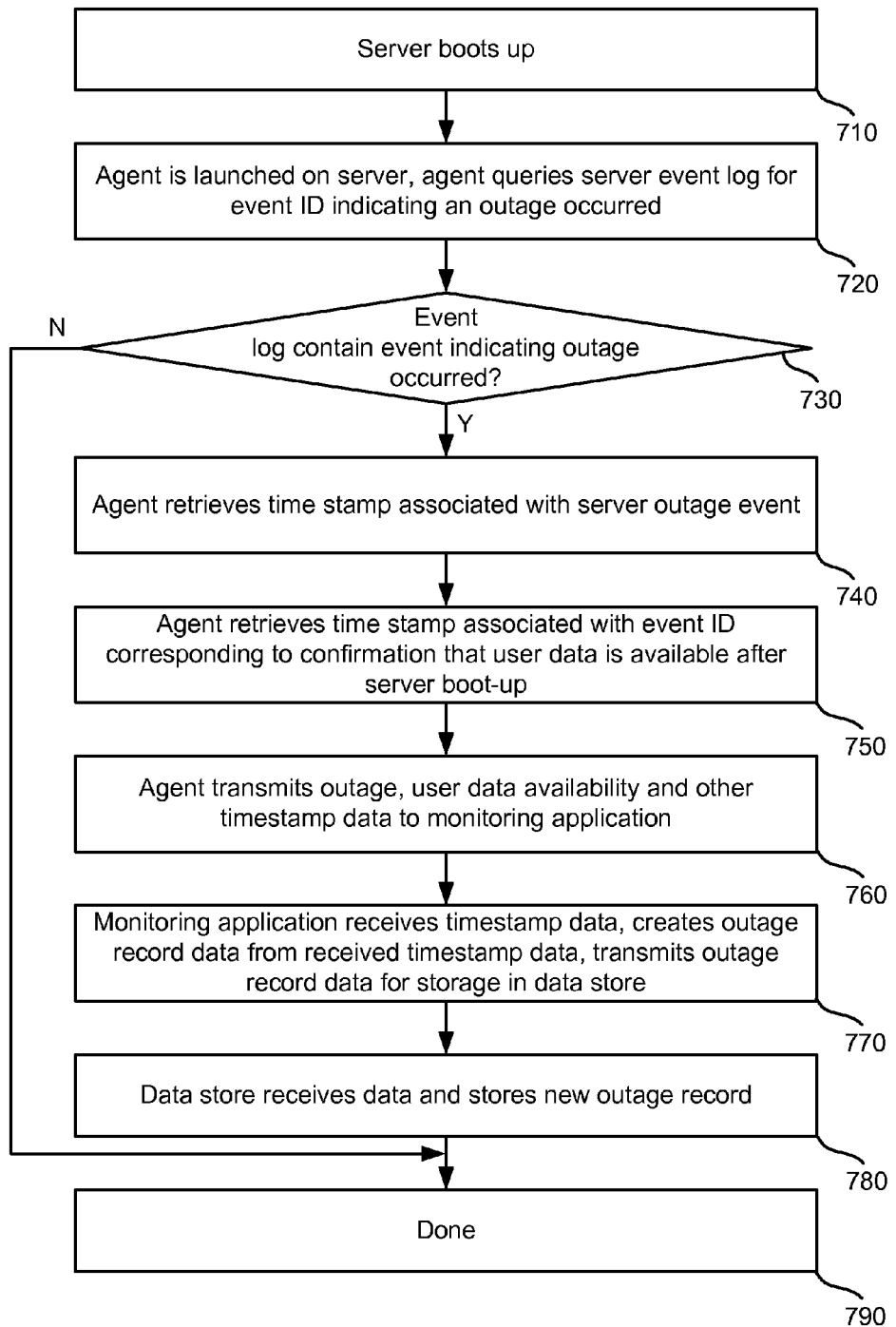
FIG. 7 is a flowchart of an embodiment of a method for generating an outage record.

FIG. 7 is a flowchart of an embodiment of a method for generating an outage record. The method of FIG. 7 provides more detail for step 350 of FIG. 3. First, application server 110 boots up at step 710. Next, agent 118 is launched on server 110 and agent 118 queries a server event log for an event ID indicating an outage occurred at step 720. The event ID may be associated with the server outage, a server malfunction known to freeze a server, or some other event ID associated with a server outage or degradation of performance. A determination is then made as to whether the server event log contains an event indicating whether or not an outage occurred at step 730. If the event log contains an event which indicates an outage occurred, the method of FIG. 7 continues to step 740. If the event log does not contain an event which indicates an outage occurred, the method of FIG. 7 is done at step 790.

Agent 110 retrieves a timestamp associated with the server outage event at step 740. The timestamp may be retrieved from the event log or some other source. In some embodiments, other data may be collected as well, such as the number of users that were logged on at the time that the server outage occurred. After retrieving a timestamp associated with the server outage, agent 118 retrieves a timestamp associated with an event ID indicating that user data is made available by the server after a server boot-up process has completed at step 750. The timestamp retrieved at step 750 indicates the time at which user data was available after boot-up. For example, the timestamp may be associated with the time that user mailbox data stored on server 110 is made available to users. After retrieving the timestamps, agent 118 transmits the outage and user data availability timestamp data and/or other data to monitoring application 142 at step 760. In some embodiments, the agent may transmit the number of users which had established a connection with the server at the time of the server outage.

Monitoring application 142 receives the timestamp data, creates an outage record from the received timestamp data and transits the outage record data for storage to data store 150 at step 770. Data store 150 receives the outage record data and stores the new outage record in outage table 157 at step 780. The method of FIG. 7 is then done at step 790.

Figure 8:
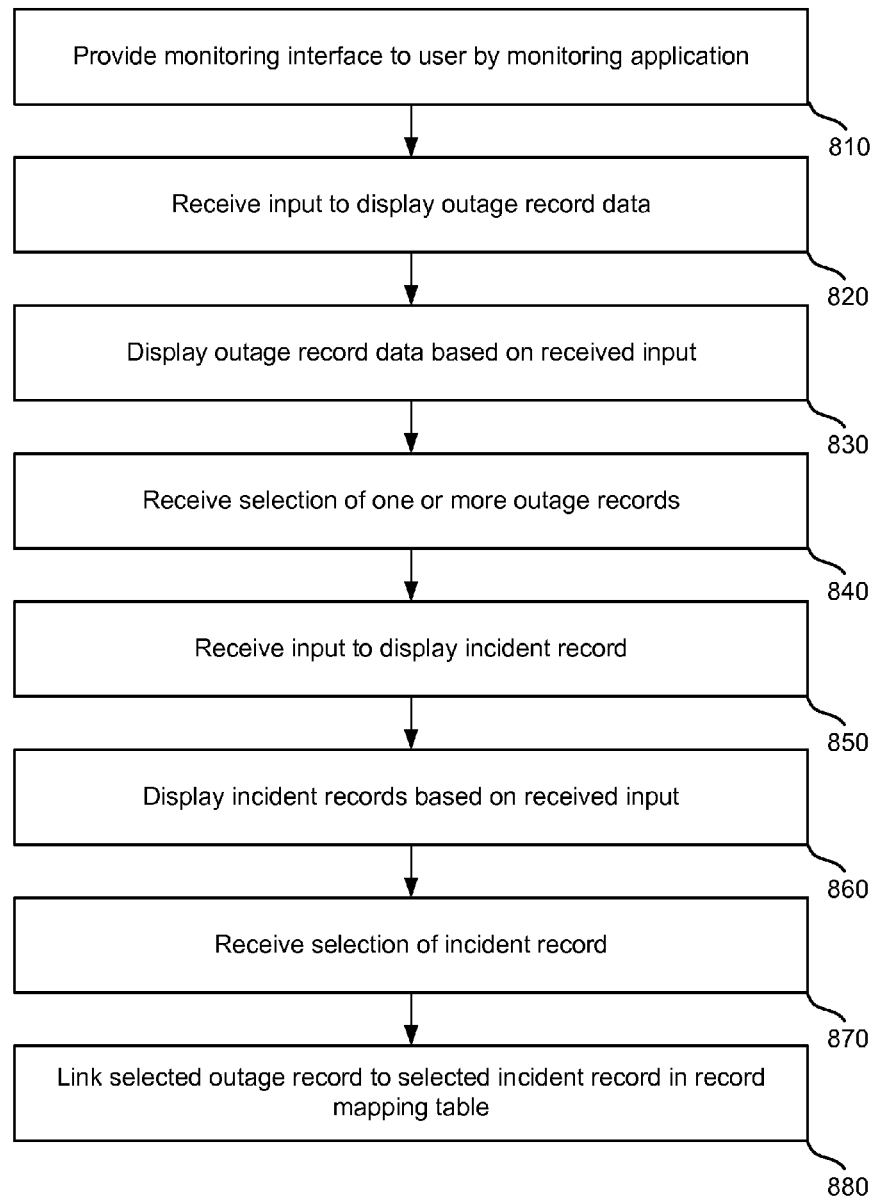
FIG. 8 is a flowchart of an embodiment of a method for linking outage records to incident records.

FIG. 8 is a flowchart of an embodiment of a method for linking outage records to incident records. In some embodiments, the method of FIG. 8 provides more detail for step 360 of the method of FIG. 3. First, monitoring interface 144 is provided to a user by monitoring application 142 at step 810. Next, input is received to display outage record data at step 820. The input is received through interface 144 and may include criteria to search outage table 157. For example, the user may provide input to display all outage records associated with a particular server, having a particular name, for outages that occurred on a particular date or time, or some other search criteria. As noted above, the sample outage table of FIG. 2D does not provide each field of possible outage data contained in an outage record.

Outage record data is displayed in monitoring interface 144 based on the received input at step 830. In some embodiments, the outage record data displayed will include one or more outage records which satisfy search criteria received as input at step 820. After displaying outage records in interface 144, a selection of one or more outage records is received at step 840. The outage records may be selected by a user through interface 144.

Input is received to display incident records at step 850. The input may include search criteria for providing one or more incident records, such as a server on which the incident occurred, the time or date the incident occurred, or other data. Incident records are then displayed on interface 144 based on the received input at step 860. The displayed incident records are those which satisfy the search criteria received at step 850. A selection is then received for an incident record at step 870. The selection may be received from a user through interface 144. After receiving a selection of an incident record from a user, the selected outage records are linked to the selected incident record in record mapping table 158 at step 880. Linking the selected outage record to the selected incident record includes sending a request to data store 150 by monitoring application 142 to generate the link or mapping between the two or more records.

Figure 9:
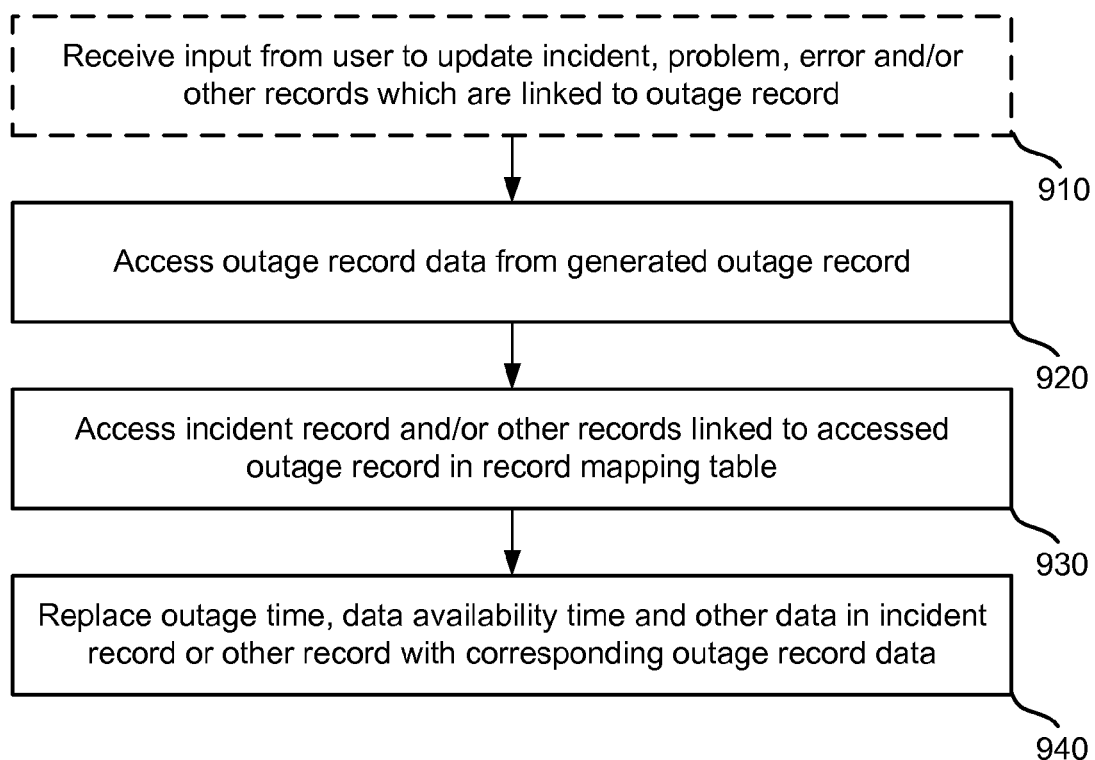
FIG. 9 is a flowchart of an embodiment of a method for updating incident records based on an outage record.

FIG. 9 is a flowchart of an embodiment of a method for updating incident records based on an outage record. The method of FIG. 9 provides more detail for step 370 of FIG. 3. First, input is received from a user to update incident, problem, error and/or other records which are linked to an outage record at step 910. The method of FIG. 9 may be performed automatically or in response to user input. Thus, receiving input from a user at step 910 is optional and only implemented when the method of FIG. 9 is not performed automatically. When performed automatically, the method of FIG. 9 is performed in response to linking one or more outage records to an incident record.

Outage record data is accessed from an outage record at step 920. The outage record may be one that was recently linked to another record or selected a user. An incident record and/or other record linked to the accessed outage record are then accessed from the record mapping table at step 930. The outage time, data availability time and other data within the incident record or other records are replaced with corresponding data of the outage record data at step 940. In some embodiments, outage record data is added to an incident record, or a link or pointer to a particular outage data field is added to the record to be updated. The process of accessing the records and replacing (or adding) data in incident and other records with outage record data is performed by business logic 159 of data store of 150.

Figure 10:
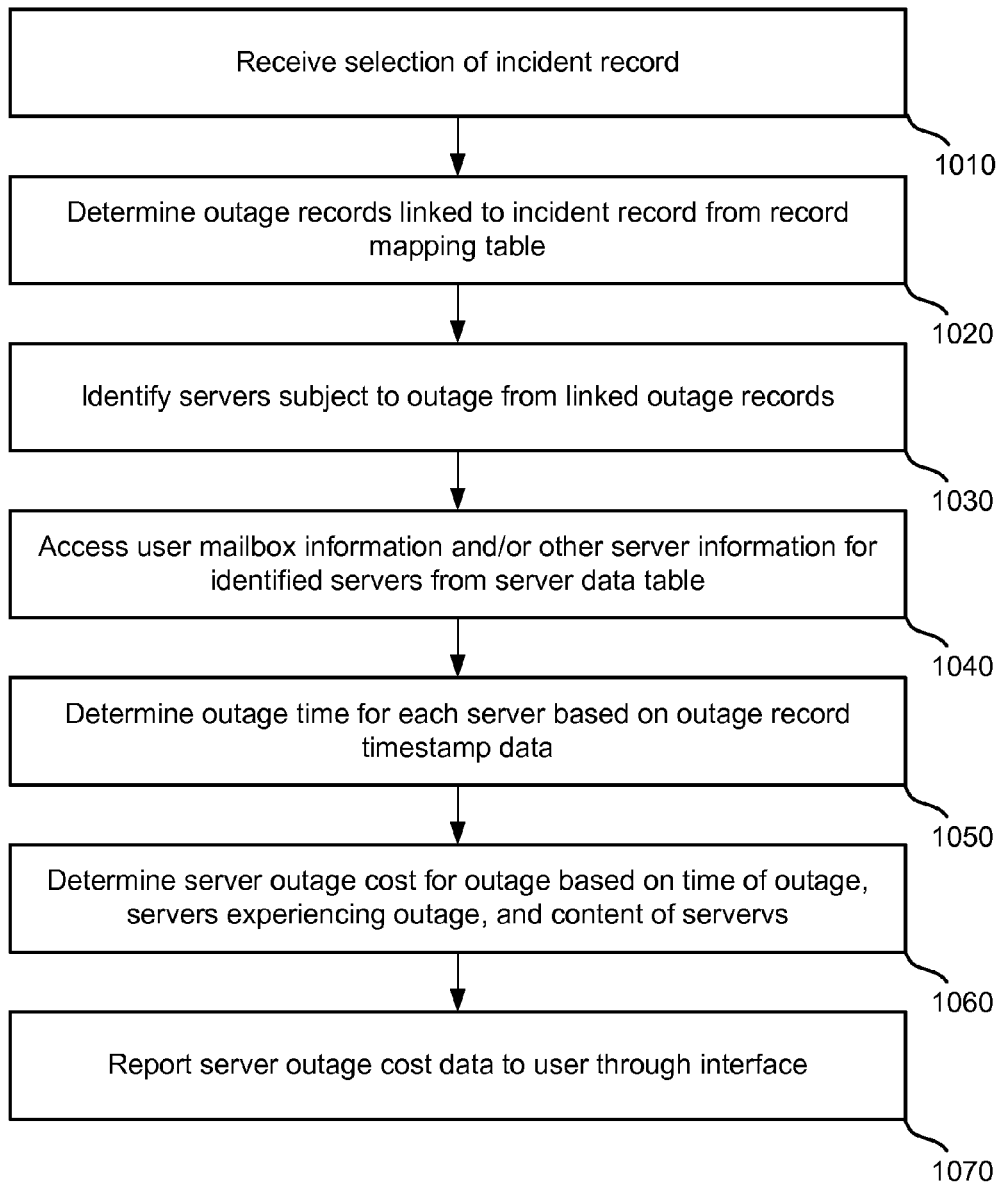
FIG. 10 is a flowchart of an embodiment of a method for reporting server outage cost for an outage.

FIG. 10 is a flowchart of an embodiment of a method for reporting server outage cost for an outage. In some embodiments, the method of FIG. 10 provides more detail for step 380 of the method of FIG. 3. First, a selection is received for an incident record at step 1010. Next, outage records linked to the selected incident record are determined from record mapping table 158 at step 1020. Servers subject to an outage are then identified from the linked outage records at step 1030. Servers subject to an outage are those identified in the outage records which are linked to the selected incident record.

User mailbox information and/or other server information are accessed for the identified servers from server data table 156 at step 1040. Thus, the data used to create the server data table 156 which contains user mailbox, configuration and other data is accessed at step 1040 for the servers identified at step 1030. For example, if a selected incident was mapped to an outage having the outage record ID "001" in the outage record table of FIG. 2D, the data for server ID "001" (second column of table) is accessed. According to the table in FIG. 2B, server 1 has 950 mailboxes (third column). The outage time for each server is determined based on the outage record timestamp data at step 1050. The outage time is determined as the difference between the time of the outage and the time at which user data was made available after the outage. The server outage cost is determined for the outage based on the time of the outage, servers experiencing the outage and the content of the servers at step 1060. For example, a server outage cost may be determined as 950 mailbox users, each experiencing an outage of 5 hours, or 4750 hours of outage. In other embodiments, the outage may be expressed as a dollar value or in some other unit. The server outage cost is then reported to a user through interface 144 at step 1070.

Figure 11:
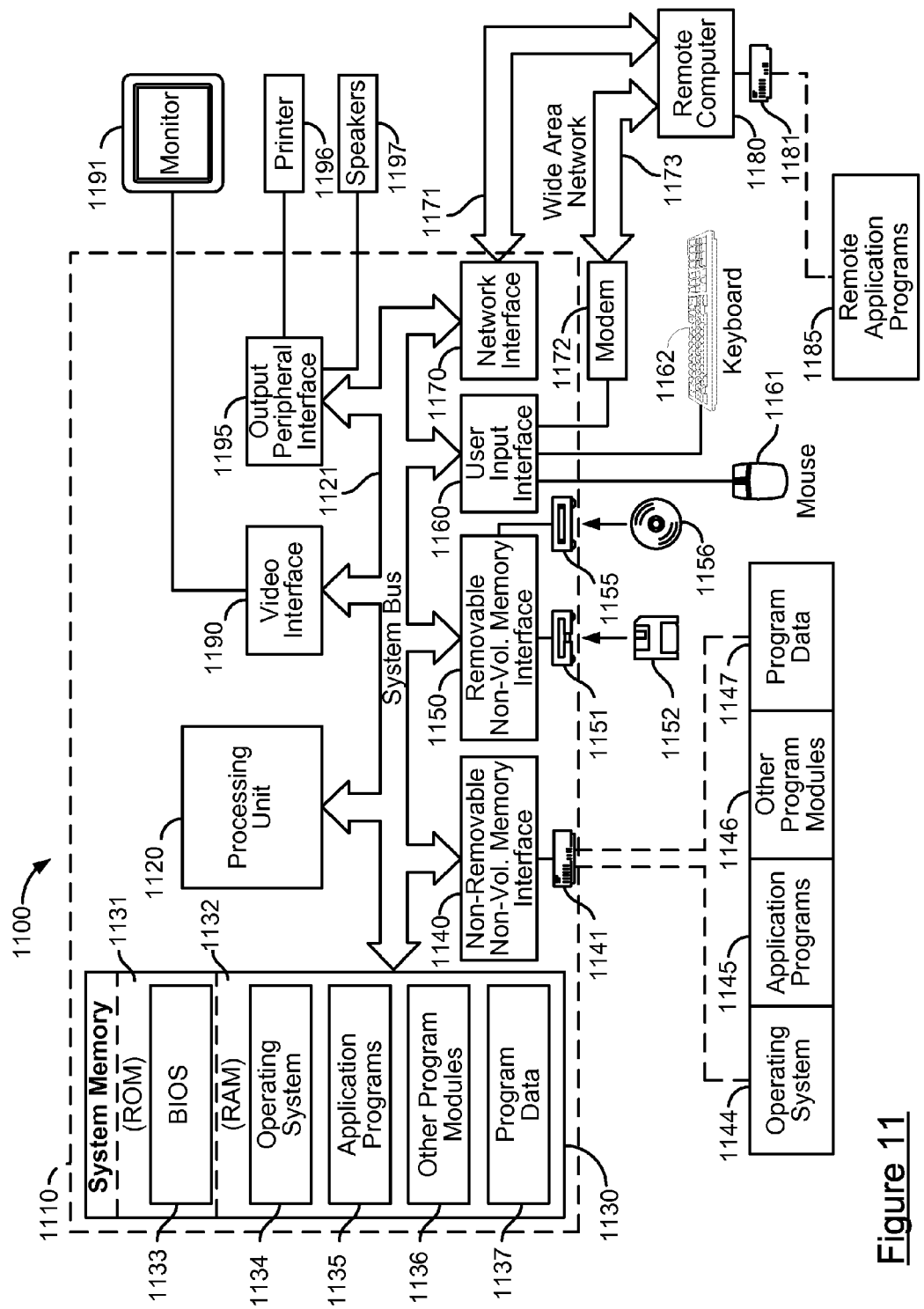
FIG. 11 is a block diagram of an embodiment of a computing environment for implementing the present technology.

FIG. 11 is a block diagram of an embodiment of a computing environment. The computing environment of FIG. 11 may be used to implement servers 110, 120 and 140 as well as data store 150. Computing environment 1100 of FIG. 11 is only one example of a suitable computing environment and is not intended to suggest any limitation as to the scope of use or functionality of the technology herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology herein includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1140 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1190.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the appended claims.

I claim:

1. A method for managing server outage data, comprising:
   receiving a first time stamp associated with an event corresponding to the start of a server outage at a monitored server;
   receiving a second time stamp associated with a time that application data was made available by the monitored server after the server outage;
   automatically storing the first time stamp and the second time stamp as an outage record;
   receiving user input associated with the server outage;
   creating an incident record in response to the received user input; and
   linking the outage record to the incident record.

2. The method of claim 1, further comprising:
   transmitting an agent to the server to be loaded at the server, wherein said first time stamp and second time stamp are received from the agent by a monitoring application.

3. The method of claim 1, wherein the first time stamp is associated with an event ID corresponding to the server outage.

4. The method of claim 1, wherein said step of receiving user input associated with a server outage includes:
   detecting a server outage for a server being monitored;
   generating an alert in response to said step of detecting a server outage;
   communicating the alert to a user; and
   receiving data from the user.

5. The method of claim 1, wherein said step of linking the outage record includes:
   storing a first identifier for the outage record and a second identifier for the incident record in a mapping table.

6. The method of claim 1, further comprising:
   updating the incident record based on the outage record.

7. The method of claim 6, wherein said step of updating includes:
   automatically updating the incident record in response to said step of linking.

8. One or more processor readable storage devices having processor readable code embodied on said processor readable storage devices, said processor readable code for programming one or more processors to perform a method comprising:
   receiving incident data for a server outage from a user;
   creating an incident record from the received incident data;
   receiving time data associated with the time that application data was unavailable during the server outage;
   automatically generating an outage record based on the time data;
   mapping the outage record to the incident record; and
   updating the incident record with data from the outage record.

9. The one or more processor readable storage devices according to claim 8, wherein the application data indicates a number of users having account data on the server.

10. The one or more processor readable storage devices according to claim 8, wherein said step of receiving time data includes:
    receiving usage data indicating the number of users having a connection with the server at the time the server outage occurred.

11. The one or more processor readable storage devices according to claim 8, wherein said step of receiving time data includes:

receiving a first time data associated with the start of a server outage;

receiving a second time data associated with a time that application data was made available by the server.

12. The one or more processor readable storage devices according to claim 8, the method further comprising:

generating a problem record from the incident record; and mapping the outage record to the problem record.

13. The one or more processor readable storage devices according to claim 8, wherein said step of updating the incident record includes:

accessing the time data of the outage record; and updating time data fields within the incident record.

14. The one or more processor readable storage devices according to claim 8, further comprising:

generating a problem record related to the incidence record; and linking one or more outage records to the problem record.

15. The one or more processor readable storage devices according to claim 8, the method further comprising:

retrieving server data from the server, the server data indicating the number of users having account data on the server;

receiving a selection of the incident record; and reporting data associated with the server outage based on the time data and server data.

16. The one or more processor readable storage devices according to claim 15, the method further comprising:

reporting the number of users which experienced interrupted service as a result of the server outage.

17. The one or more processor readable storage devices according to claim 15, the method further comprising:

reporting the product of the duration of the server outage and the number of users having account data on the server.

18. The one or more processor readable storage devices according to claim 8, further comprising:

generating a change record related to the incidence record; and linking one or more outage records to the change record.

19. A method for providing server outage data management, comprising:

providing an agent or installation on an application server;

loading the agent upon a boot-up of the application server;

detecting a first event ID by the agent, the first event ID associated with a server outage event;

retrieving a first time stamp associated with the first event ID;

detecting a second event ID by the agent in response to retrieving the first time stamp, the second event ID associated with an indication that application data is available;

retrieving a second time stamp associated with the second event ID; and transmitting the first time stamp and second time stamp to a monitoring application;

automatically creating an outage record based on the first time stamp and second time stamp;

linking the outage record to an incident record created by a user and associated with the server outage;

updating the incident record based on first time stamp and second time stamp in the outage record;

accessing server data associated with the server at which the outage occurred, the server data indicating the number of users having account data on the server; and reporting outage cost information derived from the first time stamp, second time stamp, and server data.

20. The method of claim 19, wherein said step of reporting includes:

reporting an indication of user data access which was affected by the server outage.

* * * * *